(12) United States Patent
Olson

(10) Patent No.: US 10,688,709 B2
(45) Date of Patent: Jun. 23, 2020

(54) PINCH-FORMED BLOW MOLDED BRACKET OFF THE PARTING LINE

(71) Applicant: MANN+HUMMEL GMBH, Ludwigsburg (DE)

(72) Inventor: Bradley Olson, Richland, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 552 days.

(21) Appl. No.: 15/277,410

(22) Filed: Sep. 27, 2016

(65) Prior Publication Data

US 2017/0232657 A1  Aug. 17, 2017

Related U.S. Application Data

(60) Provisional application No. 62/295,411, filed on Feb. 15, 2016.

(51) Int. Cl.

| | |
|---|---|
| *B29C 49/54* | (2006.01) |
| *B29C 49/70* | (2006.01) |
| *B29C 49/64* | (2006.01) |
| *F16L 9/12* | (2006.01) |
| *B29D 23/00* | (2006.01) |
| *B29L 23/00* | (2006.01) |
| *B29L 31/30* | (2006.01) |

(52) U.S. Cl.
CPC .............. *B29C 49/54* (2013.01); *B29C 49/64* (2013.01); *B29C 49/70* (2013.01); *B29D 23/001* (2013.01); *F16L 9/12* (2013.01); *B29L 2023/22* (2013.01); *B29L 2031/30* (2013.01)

(58) Field of Classification Search
None
See application file for complete search history.

(56) References Cited

U.S. PATENT DOCUMENTS 6,290,094 B1 * 9/2001 Arnold .................. B29C 49/482
                                                              215/235
2015/0176547 A1  6/2015 Stec et al.

FOREIGN PATENT DOCUMENTS

DE          10026355 A1    1/2002

* cited by examiner

*Primary Examiner* — Monica A Huson
(74) *Attorney, Agent, or Firm* — James Hasselbeck

(57) ABSTRACT

Blow molded plastic components are disclosed having integrally formed brackets, formed together with the component in the molding step. A method of blow molding is disclosed for integrally forming brackets onto a blow molded component. More specifically, the disclosures relates to a blow molded plastic component having a bracket formed integrally in the blow molding process and configured to rotate onto and lockably engage undercut features or lugs formed integrally on the outer surface of the blow molded component, all features formed during the molding process.

3 Claims, 4 Drawing Sheets

PINCH-FORMED BLOW MOLDED BRACKET OFF THE PARTING LINE

TECHNICAL FIELD

The invention relates to blow molded components having integrally a formed bracket and a method of blow molding process for integrally forming brackets on a blow molded component when the component is formed. More specifically, the disclosures relates to a blow molded plastic component having a bracket formed integrally in the blow molding process and configured to rotate onto and lockably engage undercut features or lugs formed integrally on the outer surface of the blow molded component, all features formed during the molding process.

BACKGROUND OF THE INVENTION

Blow molded components such as air intake ducts, resonators, air filter housings and other types of components for use in motor vehicles often need to be provided with mounting brackets, mount pads or other features for mounting and supporting the component on the vehicle body structure or other components.

In the art it is known to mold or fabricate mounting brackets from metal or plastic and then secure these brackets onto the blow molded components using a variety of means well known to those skilled in the art, such as by glue, screws, clamps or alternately ultrasonic or thermal welding processes.

Such conventional methods add additional component cost to blow molded components and necessarily slow down the production cycle times and productivity by requiring completion of addition steps and materials to manufacture each blow molded component.

SUMMARY OF THE INVENTION

An object of the present invention to provide blow molded, preferably hollow, components having one or more brackets formed together in one piece and at the same time in the same mold with the part, therefore providing blow molded components having integrally formed brackets provided in the same molding process. Some advantageous examples of blow molded components with integrally formed brackets include air intake ducts for internal combustion engines, air intake resonators, air filter housings and other components for use in motor vehicles or other application which may require mounting brackets, mount pads or other features for mounting the components onto other components or possibly onto a vehicle body member.

In general, such plastic components may be produced by a blow molding process using a plastic resin material. The mold may include two mold halves, which when closed together, define a mold cavity having the desired shape of the finished component.

In one aspect of the invention, a molded plastic component has a hollow blow molded plastic body. A bracket is integrally formed together with the blow molded plastic body in one piece and of the same material in the same mold as the plastic component. The bracket includes at least one through-opening or window that may extend completely through the bracket. The blow molded body includes at least one undercut feature or lug integrally formed in one piece together with the blow molded body on an outer surface of the blow molded body, and may project outwardly from the blow molded body. The at least one undercut feature or lug includes an undercut or groove, the undercut or groove configured to lockably engage with opposing lateral edges of the at least one through-opening or window to lockably secure and fix the bracket in position and onto the outer surface of the blow molded body.

In some aspects of the invention, the bracket includes a mounting portion having at least one mounting aperture or hole, the mounting portion and at least one aperture of hole configured and adapted for supportably mounting the blow molded body onto another component.

In some aspects of the invention, the bracket is rotatably secured onto the hollow blow molded plastic body by a living hinge formed between the bracket and the outer side of the blow molded plastic part. The living hinge formed as linear groove of thinned material in the bracket about which the bracket is rotatable relative to the molded plastic body.

In some aspects of the invention, the living hinge may be formed at the parting line of the mold and may be parallel to the parting line of the mold.

In some aspects of the invention, the at least one through opening or window of the bracket is a generally rectangular window, the generally rectangular window having two lateral edges arranged on opposing sides of the rectangle. The two lateral edges individually lockably engaging with the at least one undercut feature or lug of the hollow blow molded plastic body. The two lateral edges extending in a direction substantially parallel to the living hinge.

In some aspects of the invention, the at least one through opening or window of the bracket is a generally rectangular window, the generally rectangular window having two lateral edges arranged on opposing sides of the rectangle. The two lateral edges individually lockably engaging with the at least one undercut feature or lug of the hollow blow molded plastic body. The two lateral edges extending in a direction substantially perpendicular to the living hinge.

Also disclosed herein is a method of manufacturing a hollow blow molded plastic part.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
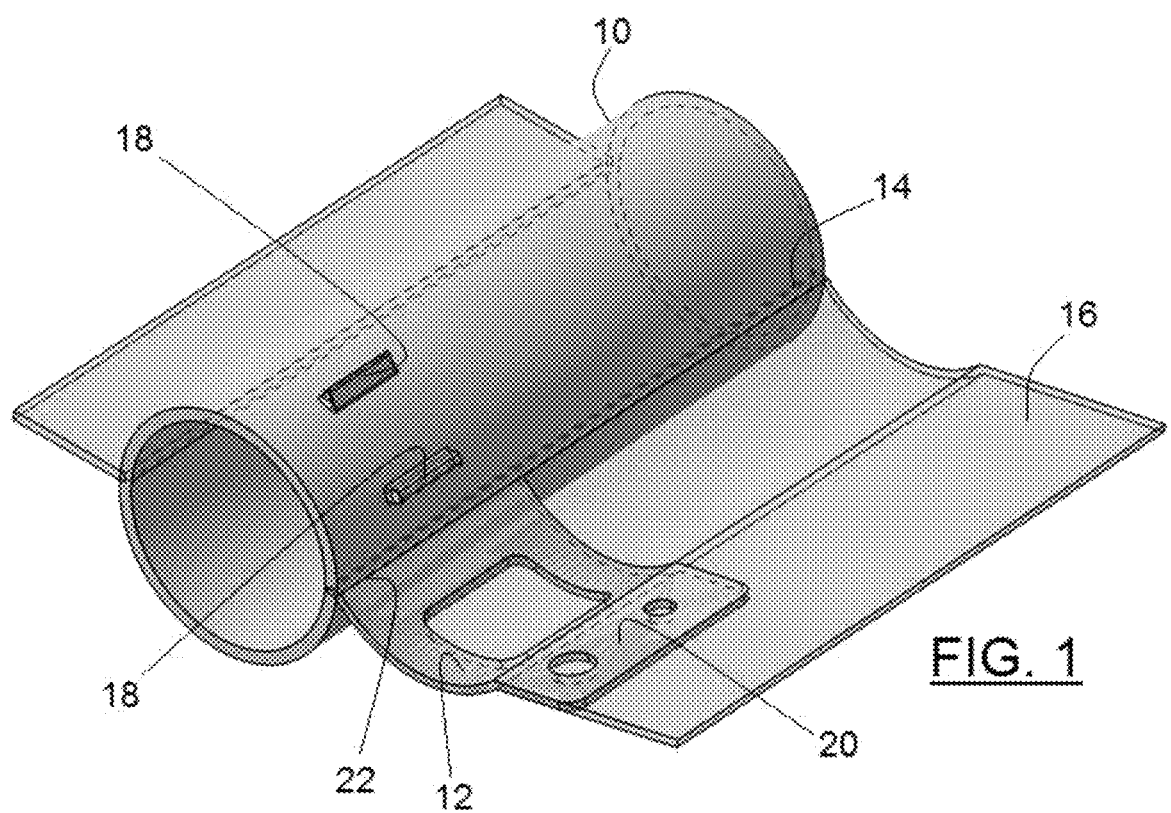
FIG. 1 schematically depicts a hollow blow molded component having a bracket formed integrally therewith, the component having undercut features or lugs formed on the outer surface of the molded component.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a blow molded components having integrally formed brackets and to blow molding processes for forming such blow molded components having the integrally formed brackets. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

For understanding and enabling disclosure, FIGS. 1-4 depict an example hollow cylindrical blow molded component 10 having an integrally formed bracket 12 formed together with the blow molded component 10. The example component 10 may (for example) be a portion of an air intake duct or other blow molded, preferably hollow, component as sometimes may be applied to automotive applications. As an example, the illustrated component is a hollow cylindrical blow molded component 10 formed as one unitary piece plastic body. A relatively simple part is illustrated to provide an easily understood depiction the inventive blow molded components and blow molding process discussed herein. Advantageously, the plastic body has a bracket 12 formed together with the blow molded component 10 in the blow molding process. The bracket 12 is preferably formed on the parting line 14 of the mold (not shown). The bracket is advantageously formed together with and fix in the molding process onto the blow molded component 10 by a flexible living hinge 22, the living hinge may be a relatively thin portion of the bracket where the bracket secures to the outer side of the blow molded component 10. In general, the bracket is rotatable generally about the parting line about the living hinge 22 formed in the molding process. The bracket with or without the living hinge is formed together in the mold with the blow molded component 10. The bracket, when formed, may extend radially outwardly from the side of the component 10 and is shown in FIG. 1 arranged on the lay flat 16 of the blow mold.

A plurality of undercut features 18 or lugs are formed on the exterior of the blow molded component 10 during the blow molding process and are arranged and formed proximate to the bracket final location on the outside of the blow molded component 10. The undercut features 18 or lugs project radially outwardly away from the radial exterior side of the blow molded component 10. The undercut features or lugs 18 may advantageously have undercuts or grooves 24 formed into the side of the undercut features 18, forming a ledge or groove configured to capture and securely fixedly engage the bracket onto the side of the hollow cylindrical blow molded component 10.

The bracket 12 may include one or more through-openings or windows 26 extending completely through the bracket and having opposing lateral edges 28, 30 configured to lockable engage and be captured into the undercuts or grooves 24 of the undercut features or lugs 18 so as to securely fix the bracket 12 onto the side of the hollow cylindrical blow molded component 10. The though-opening may be rectangular, oval or other shapes. The lugs 18 may advantageously be spaced apart to engage opposite sides of through-openings or window 26, sides preferably arranged parallel to the flexible living hinge 22. In other aspects of the invention, the lugs 18 may advantageously be spaced apart and arranged substantially in parallel with an axis of the flexible living hinge 22, so the to engage opposing sides of the through-openings or windows 26, the lugs 18 spaced apart in a direction substantially parallel to the axis of the flexible living hinge 22.

The bracket 12 is advantageously formed in the blow mold along a pinch or parting line 14 of the mold. The pinch or parting line 14 corresponds to the location where at least two mold halves (not shown) meet when they are closed. The mold halves defining the mold cavity which defines at least the outer shape of the finished hollow cylindrical blow molded component 10. The parting line of the mold defines a parting line 14 of the blow molded component 10, as shown in FIGS. 1, 2 and 4.

Figure 2:
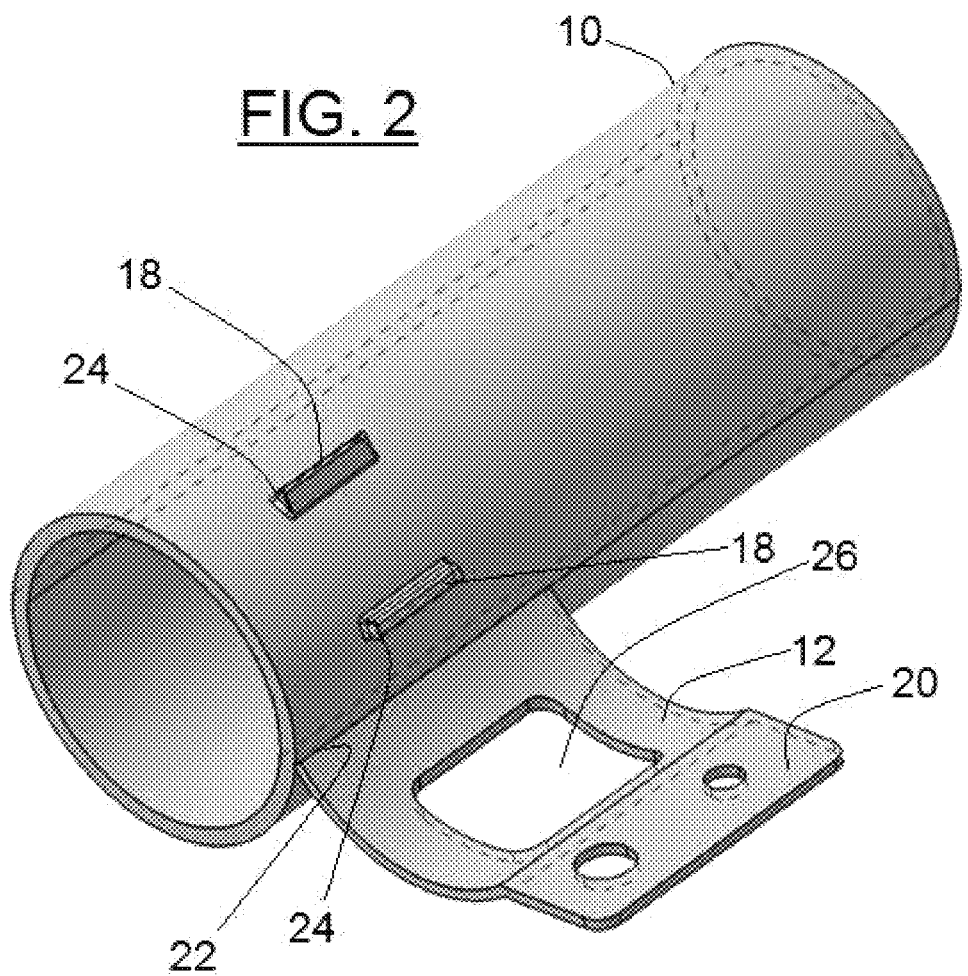
FIG. 2 schematically depicts the hollow blow molded component of FIG. 1 having the layflat removed from the hollow blow molded component.
Figure 3:
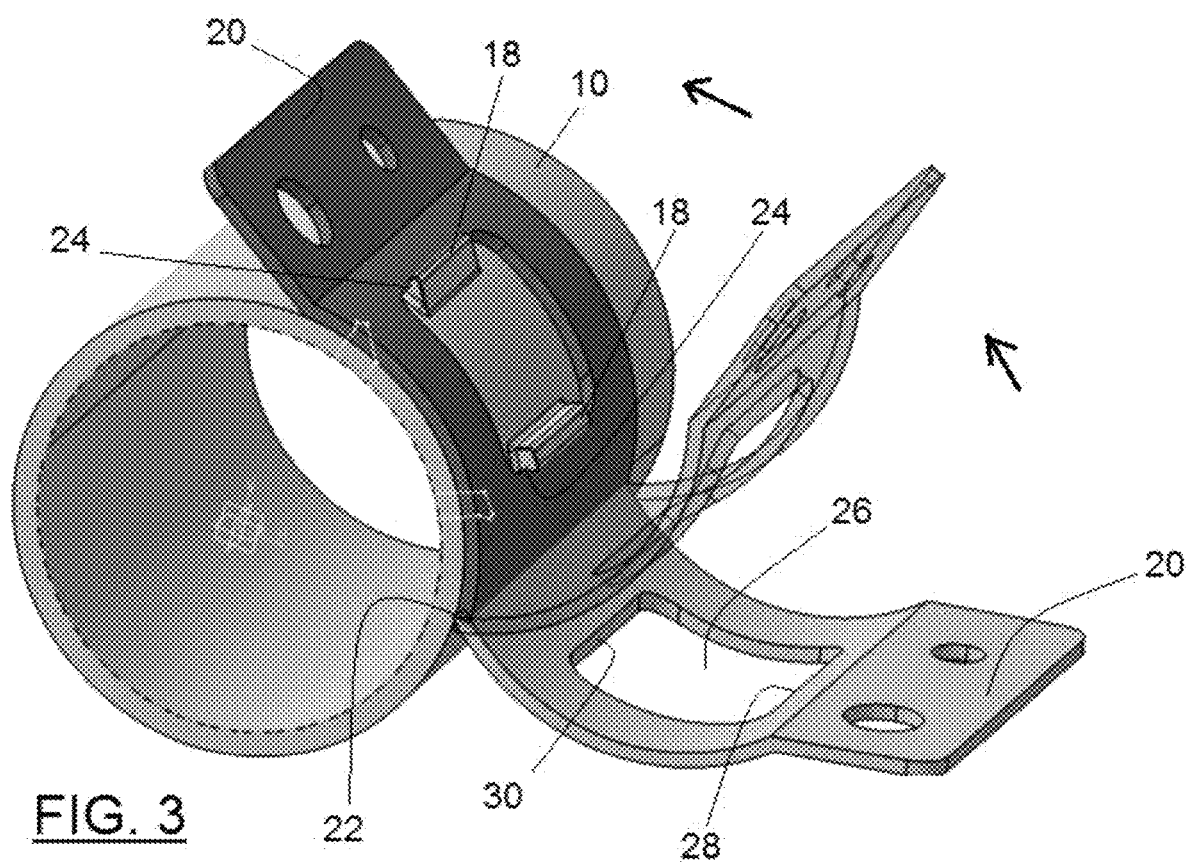
FIG. 3 schematically depicts the bracket rotating into position on the radially outer side of the hollow blow molded component 10.
Figure 4:
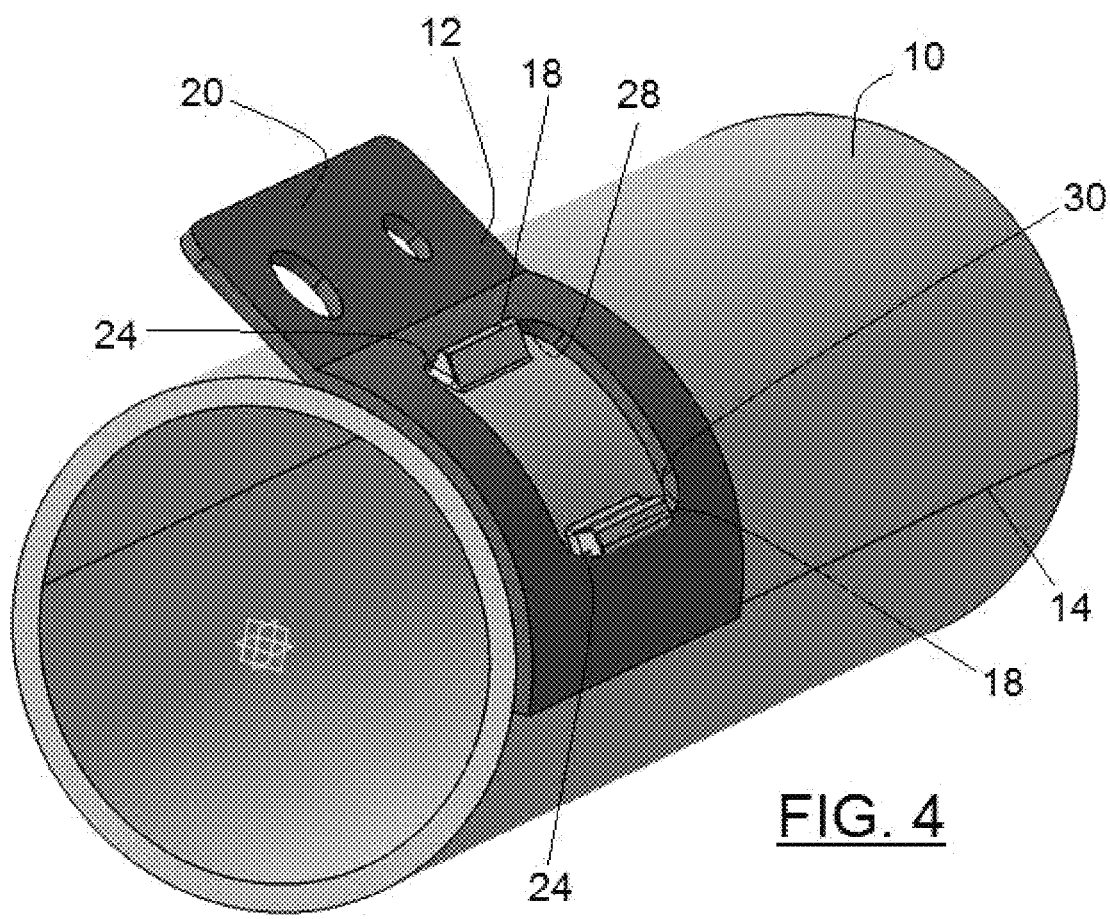
FIG. 4 schematically depicts the bracket secured snapped and locked in its final position into the undercuts or grooves of undercut features or lugs, securely fixing the bracket onto the radially outer surface of the hollow blow molded component for mounting to another component.

When the blow molded part 10 is removed from the molding machine (not shown), the bracket 12 is then rotated about the parting line, rotated over and onto the radial exterior side of the blow molded component 10 where the bracket lockably engages the undercut features or lugs 18 (see FIGS. 2-4). The undercuts or grooves 24 of the undercut features or lugs 18 capture respective ones of the opposing lateral edges 28, 30 of the one or more through-openings or windows 26 of the bracket 12 to thereby securely fix and mount the bracket onto the exterior side of the cylindrical blow molded component 10.

Preferably, the bracket 12 is rotated about the parting line to lockably engage the undercut features or lugs 18 when the blow molded component 10 is removed from the mold, preferably before the blow molded component is completely cooled. As the part then cools, the bracket 12 is securely and permanently locked to the undercut features or lugs 18 as the plastic material further solidifies. As the bracket cools, the bracket 12 becomes more rigid and may be reduced in size due to the cooling and thermal expansion properties of the molded material. This is advantageous as the contraction and stiffening of the bracket forms a more tensioned and secure lock onto the undercut features or lugs 18.

Preferably, the bracket is molded on the parting line 14 so that the blow molded component 10 may be easily removed from the mold when the mold halves are opened, without interferences.

By practicing the disclosed invention, production cycle times can be reduced, costs can be reduced; the number of manufacturing steps are reduced. As disclosed in FIGS. 1.4, the brackets can be provided having mounting features arranged at any desired position, and are advantageously not limited to be located at the parting line (see FIGS. 3, 4).

Also disclosed is a method manufacturing a blow molding component having integrally formed brackets.

FIG. 1 schematically depicts a hollow blow molded component 10 having a bracket 12 formed integrally therewith at a parting line 14. The bracket 12 is illustrated as arranged on a lay flat 16 of the mold (not shown). The bracket is formed integrally with the hollow blow molded component 10 in the mold.

In FIG. 2, the layflat 16 is removed from the hollow blow molded component 10 and bracket 12.

In FIG. 3, the bracket 12 is rotated about the parting line 14 onto position on the radially outer side of the hollow blow molded component 10. The at least one through-opening or window 26 of the bracket has opposing lateral edges 28,30 that lockably engage into undercuts or grooves 24 of undercut features or lugs 18 formed integrally with the hollow blow molded component 10 on the radial exterior of the hollow blow molded component 10.

In FIG. 4, the bracket is shown secured snapped and locked into the undercuts or grooves 24 of undercut features or lugs 18, securely fixing the bracket 12 onto the radially outer surface of the hollow blow molded component 10.

It is to be understood that FIGS. 1-4 schematically illustrate the invention using a simplified cylindrical hollow plastic component. It is to be understood that the illustrations are simplified for discussion and enablement so as to easily and directly disclose the inventive concepts of the blow molded plastic components having one or more integrally formed and rotatable brackets and to illustrate and disclose methods of manufacturing such blow molded plastic components. The invention is not limited to the specific embodiments disclosed in the drawing but is instead to be understood broadly as a disclosure of the general structural features and manufacturing method steps.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of manufacturing a hollow molded plastic component, comprising the steps of:
providing a mold having at least two mold halves that, when closed together, meet at a parting line and defining a mold cavity:
the mold cavity defining an outer surface of the hollow molded plastic component;
the mold cavity defining at least one undercut feature or lug integrally formed on the outer surface of the hollow molded plastic component;
the mold cavity defining a bracket formed on a parting line of the mold and extending radially outwardly at the parting line away from the hollow molded plastic component;
blow molding the hollow molded component in the mold cavity, the hollow molded component, the at least one undercut feature or lug and the bracket all formed in the mold in the blow molding step at the same time, all blow molded together at the same time in the same mold, forming together in one blow molding step a one piece singular blow molded plastic component;
opening the at least two mold halves;
at least partially removing the one piece singular blow molded plastic component from the mold;
rotating the bracket about the parting line to lockably engage the bracket with the at least one undercut feature or lug to lockable secure the bracket onto the outer surface of the hollow molded plastic component;
wherein the rotating step is practiced before the hollow molded plastic component has cooled;
wherein, after the rotating step, the method includes cooling the hollow molded plastic component to complete the securing of the bracket onto the at least one undercut feature or lug.

2. A method of manufacturing a hollow molded plastic component, comprising the steps of:
providing a mold having at least two mold halves that, when closed together, meet at a parting line and defining a mold cavity:
the mold cavity defining an outer surface of the hollow molded plastic component;
the mold cavity defining at least one undercut feature or lug integrally formed on the outer surface of the hollow molded plastic component;
the mold cavity defining a bracket formed on a parting line of the mold and extending radially outwardly at the parting line away from the hollow molded plastic component;
blow molding the hollow molded component in the mold cavity, the hollow molded component, the at least one undercut feature or lug and the bracket all formed in the mold in the blow molding step at the same time, all blow molded together at the same time in the same mold, forming together in one blow molding step a one piece singular blow molded plastic component;
opening the at least two mold halves;
at least partially removing the one piece singular blow molded plastic component from the mold;
rotating the bracket about the parting line to lockably engage the bracket with the at least one undercut feature or lug to lockable secure the bracket onto the outer surface of the hollow molded plastic component;
wherein in the blow molding step, the bracket includes a mounting portion having at least one mounting hole, the mounting portion and at least one hole configured and adapted for supportably mounting the hollow molded plastic component onto another component.

3. The method according to claim 2, wherein
in the blow molding step, the bracket is formed to have a flexible living hinge, the living hinge formed between and connecting the bracket and the outer side of the hollow blow molded plastic component, the flexible living hinge formed as linear groove of thinned material in the bracket;
wherein in the blow molding step, the bracket is formed to have a generally rectangular window, the generally rectangular window having two lateral edges arranged on opposing sides of the rectangle;
wherein, in the rotating step, the two lateral edges lockably engage with the at least one undercut feature or lug;
wherein the lateral edges extend in a direction substantially perpendicular to the flexible living hinge.

\* \* \* \* \*